United States Patent
Karuppaiah et al.

(10) Patent No.: US 12,359,326 B1
(45) Date of Patent: Jul. 15, 2025

(54) HYBRID ELECTROCATALYST LAYERS FOR MEMBRANE-BASED ELECTROCHEMICAL DEVICES AND PROCESSES FOR MAKING THE SAME

(71) Applicant: Ohmium International, Inc., Newark, CA (US)

(72) Inventors: Chockkalingam Karuppaiah, Fremont, CA (US); Arne Ballantine, Incline Village, NV (US)

(73) Assignee: Ohmium International, Inc., Newark, CA (US)

( * ) Notice: Subject to any disclaimer, the term of this patent is extended or adjusted under 35 U.S.C. 154(b) by 0 days.

(21) Appl. No.: 18/912,526

(22) Filed: Oct. 10, 2024

Related U.S. Application Data (62) Division of application No. 18/778,577, filed on Jul. 19, 2024.

(51) Int. Cl.
| | |
|---|---|
| C25B 9/23 | (2021.01) |
| C25B 11/051 | (2021.01) |
| C25B 13/08 | (2006.01) |
| H01M 4/88 | (2006.01) |

(52) U.S. Cl.
CPC .............. *C25B 9/23* (2021.01); *C25B 11/051* (2021.01); *C25B 13/08* (2013.01); *H01M 4/8814* (2013.01); *H01M 4/8885* (2013.01); *H01M 4/8896* (2013.01)

(58) Field of Classification Search
None
See application file for complete search history.

(56) References Cited

U.S. PATENT DOCUMENTS

| | | | |
|---|---|---|---|
| 5,840,192 A | | 11/1998 | El Moussaoui et al. |
| 6,010,612 A | * | 1/2000 | Freire ............... C25B 9/23 205/438 |
| 6,756,150 B2 | | 6/2004 | Karuppaiah et al. |
| 7,947,411 B1 | | 5/2011 | Morioka |
| 8,669,499 B2 | | 3/2014 | Conrad |
| 11,616,246 B2 | | 3/2023 | Ramani et al. |
| 12,091,518 B2 | | 9/2024 | Karuppaiah et al. |
| 2001/0031389 A1 | | 10/2001 | Appleby et al. |
| 2003/0059657 A1 | | 3/2003 | Stone et al. |
| 2003/0175579 A1 | | 9/2003 | Uchida |

(Continued)

FOREIGN PATENT DOCUMENTS

| | | |
|---|---|---|
| CN | 107737614 A | 2/2018 |
| CN | 210340758 U | 4/2020 |

(Continued)

OTHER PUBLICATIONS

PCT Application No. PCT/US2023/014274 International Search Report and Written Opinion dated Jun. 1, 2023.

(Continued)

*Primary Examiner* — Wojciech Haske
(74) *Attorney, Agent, or Firm* — Polsonelli LLP (57) ABSTRACT

Hybrid electrocatalyst layers for use in an electrochemical cell and processes for making the same are described. The hybrid electrocatalyst layers include at least one ion-conducting layer and at least one nonionic conductive catalyst layer. The processes for making the hybrid electrocatalyst layers include a sintering step, which provides greater durability of the hybrid electrocatalyst layers.

20 Claims, 7 Drawing Sheets

(56) References Cited

U.S. PATENT DOCUMENTS

| | | |
|---|---|---|
| 2003/0190517 A1* | 10/2003 | Elter .................. H01M 8/1039 |
| | | 429/492 |
| 2003/0232714 A1 | 12/2003 | Yan |
| 2004/0191601 A1 | 9/2004 | Grot |
| 2006/0204831 A1 | 9/2006 | Yan et al. |
| 2017/0338494 A1 | 11/2017 | Yoon et al. |
| 2019/0077780 A1 | 3/2019 | Shu et al. |
| 2019/0312293 A1 | 10/2019 | Ramani et al. |
| 2022/0049367 A1 | 2/2022 | Ballantine et al. |
| 2023/0279564 A1 | 9/2023 | Karuppaiah |
| 2023/0287587 A1 | 9/2023 | Rojas Herrera |
| 2024/0158591 A1 | 5/2024 | Karuppaiah et al. |
| 2024/0158937 A1 | 5/2024 | Karuppaiah et al. |
| 2025/0084226 A1 | 3/2025 | Karuppaiah et al. |

FOREIGN PATENT DOCUMENTS

| | | | |
|---|---|---|---|
| EP | 4486507 | A1 | 1/2025 |
| JP | 2010092609 | A | 4/2010 |
| WO | 2018236649 | A1 | 12/2018 |
| WO | 2022226219 | A1 | 10/2022 |
| WO | 2023167924 | A1 | 9/2023 |
| WO | 2024107748 | A2 | 5/2024 |

OTHER PUBLICATIONS

PCT Application No. PCT/US2023/014274 International Preliminary Report on Patentability dated Sep. 12, 2024.
PCT Application No. PCT/US23/79671 Invitation to Pay Additional Fees dated Feb. 15, 2024.
PCT Application No. PCT/US2023/079671 International Search Report and Written Opinion dated Apr. 24, 2024.
PCT Application No. PCT/US2024/038843 International Search Report and Written Opinion dated Sep. 23, 2024.
U.S. Appl. No. 18/509,078, Notice of Allowance dated Sep. 9, 2024.
U.S. Appl. No. 18/521,700, Office Action dated Feb. 20, 2024.
U.S. Appl. No. 18/778,577, Office Action dated Oct. 17, 2024.
Wilson, M. et al., "High Performance Catalyzed Membranes of Ultra-low Pt Loadings for Polymer Electrolyte Fuel Cells," Journal of the Electrochemical Society, vol. 139, No. 2, pp. L28-L30.
Zeliger, H., "A New Air Electrode for Fuel Cells," Journal of the Electrochemical Society, vol. 114, No. 3, pp. 236.
PCT Application No. PCT/US2023/079671, International Preliminary Report on Patentability dated May 22, 2025.

* cited by examiner

HYBRID ELECTROCATALYST LAYERS FOR MEMBRANE-BASED ELECTROCHEMICAL DEVICES AND PROCESSES FOR MAKING THE SAME

CROSS-REFERENCE TO RELATED APPLICATIONS

This application is a Divisional application of U.S. application Ser. No. 18/778,577 titled "HYBRID ELECTROCATALYST LAYERS FOR MEMBRANE-BASED ELECTROCHEMICAL DEVICES AND PROCESSES FOR MAKING THE SAME" filed Jul. 19, 2024, the entire contents of which are incorporated by reference herein.

FIELD OF THE DISCLOSURE

The present disclosure is directed toward hybrid electrocatalyst layers for use in membrane-based electrochemical devices and processes for making the same.

BACKGROUND

Electrochemical energy devices and reactors have traditionally used liquid electrolytes. In these devices and reactors, the goal to achieve good electrochemical activity was to maximize two phase and three phase contact, with the former related to devices without gaseous reactants or products, and the latter for devices involving gas phase reactants and products. This was enabled through micro- and macro-engineering of the electrocatalyst, electrode, and the device or reactor. The advent of polymeric membranes, such as perfluoro sulfonic acid-based polymers (e.g., Nation®) that conduct ions enabled a new class of electrochemical devices. However, the two-phase and three-phase optimizations now require another dimension of the interaction with a solid phase ionic conductor.

What is needed is a membrane-based cell structure with electrocatalyst layers that maximize performance and durability.

SUMMARY

Provided herein are processes for making electrochemical cells. The processes include coating an ion-conducting slurry onto a decal layer; drying the ion-conducting slurry to form an ion-conducting layer; transferring the ion-conducting layer from the decal layer onto an ion-conducting polymer membrane; coating a nonionic conductive slurry onto a species diffusion/transport layer to form a coated species diffusion/transport layer; sintering the coated diffusion layer to form a nonionic conductive catalyst layer on the species diffusion/transport layer; and hot pressing the nonionic conductive catalyst layer onto the ion-conducting layer. In some embodiments, the sintering is performed at a temperature from about 300° C. to about 400° C. In some embodiments, the ion-conducting slurry comprises a solvent, an ionomer, and an electrocatalyst. In some embodiments, the nonionic conductive slurry comprises a solvent, a nonionic conductive binder, and an electrocatalyst. In some embodiments, the hot pressing is conducted at a pressure from about 70 psi to about 150 psi and temperature from about 80° C. to about 140° C. In some embodiments, the decal layer comprises a glass fiber layer coated with polytetrafluoroethylene. In some embodiments, the ion-conducting polymer membrane comprises a perfluorosulfonic acid-based polymer. In some embodiments, the ion-conducting slurry further comprises a pore former. In some aspects, the process further comprises removing the pore former from the ion-conducting layer before transferring the ion-conducting layer from the decal layer onto the ion-conducting polymer membrane. In some embodiments, the nonionic conductive slurry further comprises a pore former. In some aspects, the process further comprises removing the pore former from the nonionic conductive catalyst layer before hot pressing the nonionic conductive catalyst layer onto the ion-conducting layer.

Further provided herein are processes for making an electrochemical cell comprising: coating a nonionic conductive slurry onto a decal layer; sintering the coated decal layer to form a nonionic conductive catalyst layer on the decal layer; coating a sodium-form ion-conducting slurry comprising a sodium-form ionomer onto the nonionic conductive catalyst layer; drying the ion-conducting slurry to form a hybrid electrocatalyst layer comprising an ion-conducting layer and a nonionic conductive catalyst layer; and hot pressing the hybrid electrocatalyst layer onto a sodium-form ion conducting polymer membrane. In some embodiments, the sintering is performed at a temperature from about 300° C. to about 400° C. In some embodiments, the ion-conducting slurry further comprises a solvent and an electrocatalyst. In some embodiments, the nonionic conductive slurry comprises a solvent, a nonionic conductive binder, and an electrocatalyst. In some embodiments, the hot pressing is conducted at a pressure from about 70 psi to about 150 psi and temperature from about 80° C. to about 140° C. In some embodiments, the decal layer comprises a glass fiber layer coated with polytetrafluoroethylene. In some embodiments, the sodium-form ion-conducting polymer membrane comprises a sodium-form perfluorosulfonic acid-based polymer. In some embodiments, the ion-conducting slurry further comprises a pore former. In some aspects, the process further comprises removing the pore former from the ion-conducting layer before transferring the ion-conducting layer from the decal layer onto the ion-conducting polymer membrane. In some embodiments, the nonionic conductive slurry further comprises a pore former. In some aspects, the process further comprises removing the pore former from the nonionic conductive catalyst layer before hot pressing the nonionic conductive catalyst layer onto the ion-conducting layer.

Further provided herein are electrochemical cells made by the processes described herein. The electrochemical cells comprise an ion-conducting polymer membrane having a first surface and a second surface; a first hybrid electrocatalyst layer having a first surface and a second surface, the first surface of the first hybrid electrocatalyst layer contacting the first surface of the ion-conducting polymer membrane, the first hybrid electrocatalyst layer comprising: a first ion-conducting layer; and a first nonionic conductive catalyst layer; a first species diffusion/transport layer contacting the second surface of the first hybrid electrocatalyst layer, wherein the first species diffusion/transport layer contacts the first nonionic conductive catalyst layer and the ion-conducting polymer membrane contacts the first ion-conducting layer; a second hybrid electrocatalyst layer having a first surface and a second surface, the first surface of the second hybrid electrocatalyst layer contacting the second surface of the ion-conducting polymer membrane, the second hybrid electrocatalyst layer comprising: a second ion-conducting layer; and a second nonionic conductive catalyst layer; and a second species diffusion/transport layer contacting the second surface of the second hybrid electrocatalyst layer, wherein the second species diffusion/transport layer contacts the second nonionic conductive catalyst layer and the ion-conducting polymer membrane contacts the second ion-conducting layer.

In some embodiments, the electrochemical cell is suitable for use in an electrolyzer, in a hydrogen pump, in gas/gas cell-based ammonia synthesis, or in gas/gas cell-based carbon dioxide electroreduction. In some embodiments, the first ion-conducting layer, the second ion-conducting layer, or both the first ion-conducting layer and the second ion-conducting layer comprises a plurality of ion-conducting layers. In some aspects, the plurality of ion-conducting layers defines a concentration gradient of an ionomer along the thickness of the plurality of ion-conducting layers. In some aspects, the plurality of ion-conducting layers defines a porosity gradient along the thickness of the plurality of ion-conducting layers. In some embodiments, the ion-conducting polymer membrane is a sodium-form ion-conducting polymer membrane. In some embodiments, the first ion-conducting layer and the second ion-conducting layer each comprise an ionomer. In some aspects, the ionomer is a sodium-form ionomer.

BRIEF DESCRIPTION OF THE FIGURES

The present disclosure may be understood by reference to the following detailed description taken in conjunction with the drawings briefly described below. It is noted that, for purposes of illustrative clarity, certain elements in the drawings may not be drawn to scale.

DETAILED DESCRIPTION

The present disclosure is directed to electrochemical cells for use in a membrane electrode assembly that include hybrid electrocatalyst layers. The disclosed electrochemical cells include an ion-conducting polymer membrane, a first hybrid electrocatalyst layer, a first species diffusion/transport layer, a second hybrid electrocatalyst layer, and a second species diffusion/transport layer as described in more detail below. The disclosed electrochemical cells isolate the species diffusion/transport layers from participating in the electrochemical reaction, thereby avoiding generation of peroxides and other undesired compounds that may electrochemically damage the ion-conducting polymer membrane.

I. Electrochemical Cell

Figure 1A:
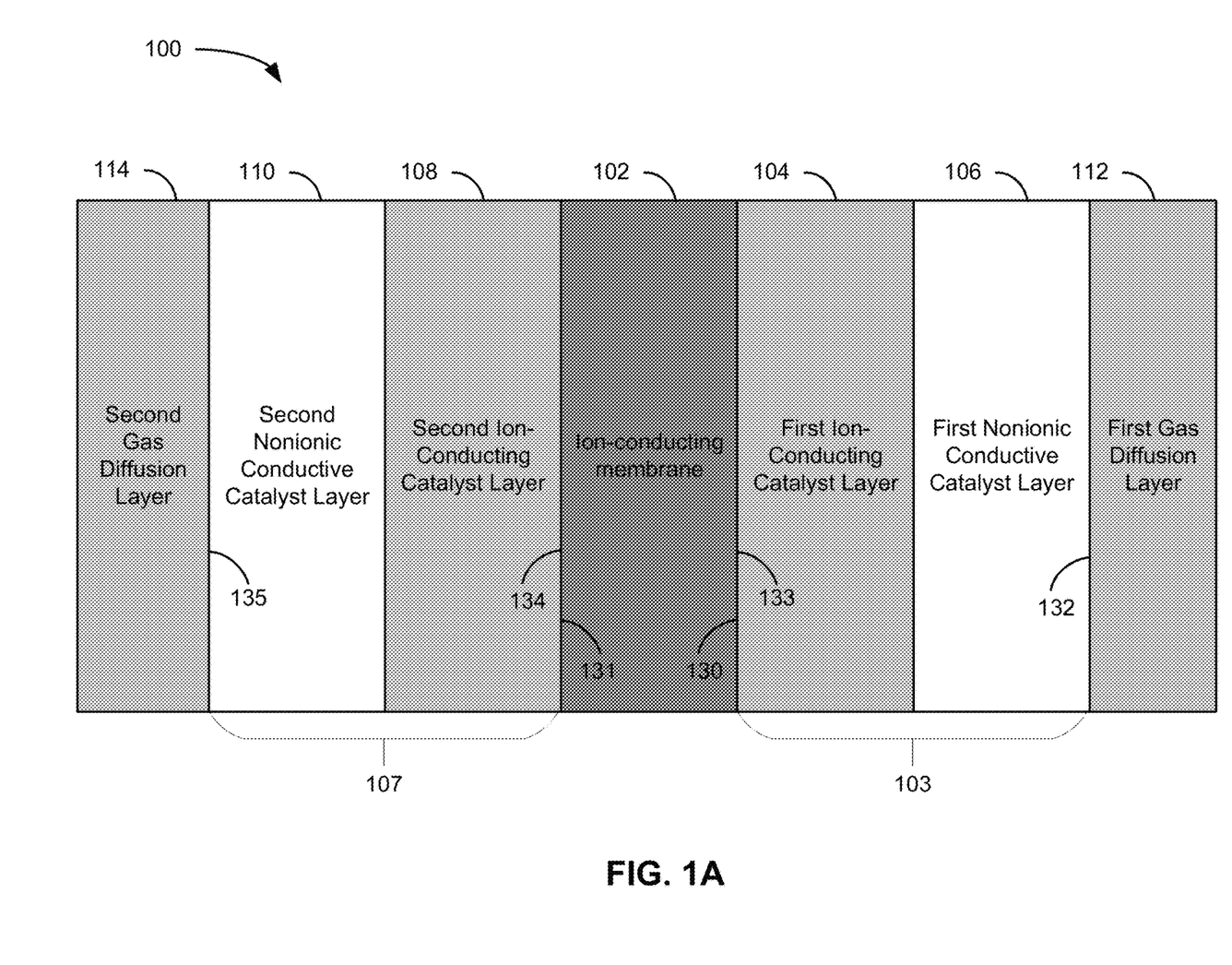
FIG. 1A shows a diagram of an electrochemical cell of the present disclosure.

FIG. 1A shows an electrochemical cell 100 of the present disclosure. The membrane module 100 includes an ion-conducting polymer membrane 102, a first hybrid electrocatalyst layer 103 that includes a first ion-conducting catalyst layer 104 and a first nonionic conductive catalyst layer 106, a second hybrid electrocatalyst layer 107 that includes a second ion-conducting catalyst layer 108 and a second nonionic conductive catalyst layer 110, a first species diffusion/transport layer 112, and a second species diffusion/transport layer 114.

The ion-conducting polymer membrane 102 includes a first surface 130 and a second surface 131 opposite to the first surface 130. The ion-conducting polymer membrane may include a proton exchange membrane (PEM), a cation exchange membrane (CEM), or an anion exchange membrane (AEM). The ion-conducting polymer membrane is formed from an ion-conducting polymer resin, such as a perfluorosulfonic acid-based polymers such as Nafion®, which is a sulfonated tetrafluoroethylene-based fluoropolymer-copolymer having the formula $C_7HF_{13}O_5S \cdot C_nF_{2n}$, where n is an integer from 3,000 to 10,000. Other ion-conducting polymer resins known in the art may also be used in the ion-conducting polymer membrane of the present disclosure, including sulfonated poly(ether ether ketone) (SPEEK), sulfonated phenylated poly(phenylene) (SPPP), sulfonated poly(ether sulfone) (SPES), sulfonated poly(sulfone) (SPSU), sulfonated polystyrene-b-poly(ethylene-r-butylene)-b-polystyrene (S-SEBS), mixtures of sulfonated poly(ethylene oxide) mixed with poly(vinyl alcohol), sulfonated polystyrene cross-linked with divinyl benzene, poly(benzimidazole) (PBI), poly(ether imide) (PEI), sulfonated poly(ether imide) (SPEI), and the like. Other ion-conducting polymer resins known for use in anion exchange membranes include per-fluoro-based polymer resins, poly(aryl ether sulfone) (PAES) and derivatives thereof, polyethylene (PE) and derivatives thereof, polyphenylene (PPN) and derivatives thereof, polystyrene (PS) and derivatives thereof, polyfluorene (PFN) and derivatives thereof, and the like.

In some embodiments, the ion-conducting polymer membrane 102 may be a sodium-form ion-conducting polymer membrane. The sodium-form ion-conducting polymer membrane is formed from an ion-conducting polymer membrane that has been boiled in a solution comprising a low concentration (e.g., about 0.1 M) of sodium hydroxide (NaOH) for an extended period of time. This causes the resin to be impregnated with sodium ions ($Na^+$). The resulting sodium-form ion-conducting polymer membrane has greater thermal stability as compared to the non-sodium-form ion-conducting polymer membrane.

The ion-conducting polymer membrane 102 may have a thickness from about 15 microns to about 125 microns. For example, the ion-conducting polymer membrane 102 may have a thickness from about 15 microns to about 50 microns, about 50 microns to about 100 microns, or about 100 microns to about 125 microns. Those having skill in the art will recognize that thinner ion-conducting polymer membranes 102 may be used in fuel cells, while thicker ion-conducting polymer membranes may be used in electrolyzers.

The first hybrid electrocatalyst layer 103 includes a first ion-conducting catalyst layer 104 and a first nonionic conductive catalyst layer 106. Although FIG. 1A only depicts a hybrid electrocatalyst layer containing two sub-layers (an ion-conducting catalyst layer and a nonionic conductive catalyst layer), those having ordinary skill in in the art will appreciate that the hybrid electrocatalyst layers of the present disclosure may include more than two sub-layers, such as an ion-conducting catalyst layer and two nonionic conductive catalyst layers, two ion-conducting catalyst layers and one nonionic conductive catalyst layer, two ion-conducting catalyst layers and two nonionic conductive catalyst layers, and so on.

The first hybrid electrocatalyst layer 103 has a first surface 132 and a second surface 133 opposite to the first surface 132. The first surface 132 contacts the first species diffusion/transport layer 112 and the second surface 133 contacts the first surface 130 of the ion-conducting polymer membrane 102. As shown in FIG. 1A, the first ion-conducting layer catalyst 104 contacts the ion-conducting polymer membrane 102 and the first nonionic conductive catalyst layer 106 contacts the first species diffusion/transport layer 112.

The first hybrid electrocatalyst layer 103 includes an electrocatalyst. The electrocatalyst is present in both the first ion-conducting catalyst layer 104 and the first nonionic conductive catalyst layer 106. The electrocatalyst particles closest to the ion-conducting polymer membrane 102 participate in the electrochemical reaction at the ion-conducting polymer membrane 102, the electrocatalyst particles furthest from the ion-conducting polymer membrane 102 (i.e., the electrocatalyst particles closest to the first species diffusion/transport layer 112) do not participate in the electrochemical reaction and instead act simply as an electronic conductor/chemical catalyst. The electrocatalyst that is closer to the first species diffusion/transport layer 112 also catalyzes the transformation of undesirable chemicals into benign compounds. For example, the electrocatalyst closer to the first species diffusion/transport layer 112 may decompose peroxides in the nonionic conductive catalyst layer to water and oxygen. Additionally, the electrocatalyst may help with downstream reactions of aldehydes formed nonionic conductive catalyst layer from the reduction of carbon dioxide, carbon monoxide, and hydrogen in the ion-conducting layer.

The electrocatalyst may include platinum in the form of platinum black, alloyed transition metals, transition metals coupled with a source of carbon or nitrogen, or a combination thereof. For example, the catalyst may include platinum, rhodium, ruthenium, cobalt, titanium, vanadium, iron, nickel, copper, zinc, zirconium, silver, palladium, gold, other transition metals known in the art, oxides thereof, or alloys thereof. In some embodiments, the catalyst may include platinum, rhodium, ruthenium, cobalt, oxides thereof, or alloys thereof.

The electrocatalyst may be unsupported or may be supported on a conductive support. The conductive support may comprise a carbon support or a metal oxide support, such as an antimony-tin oxide, an indium-tin oxide, or sub-stoichiometric oxides of titanium.

Figure 1B:
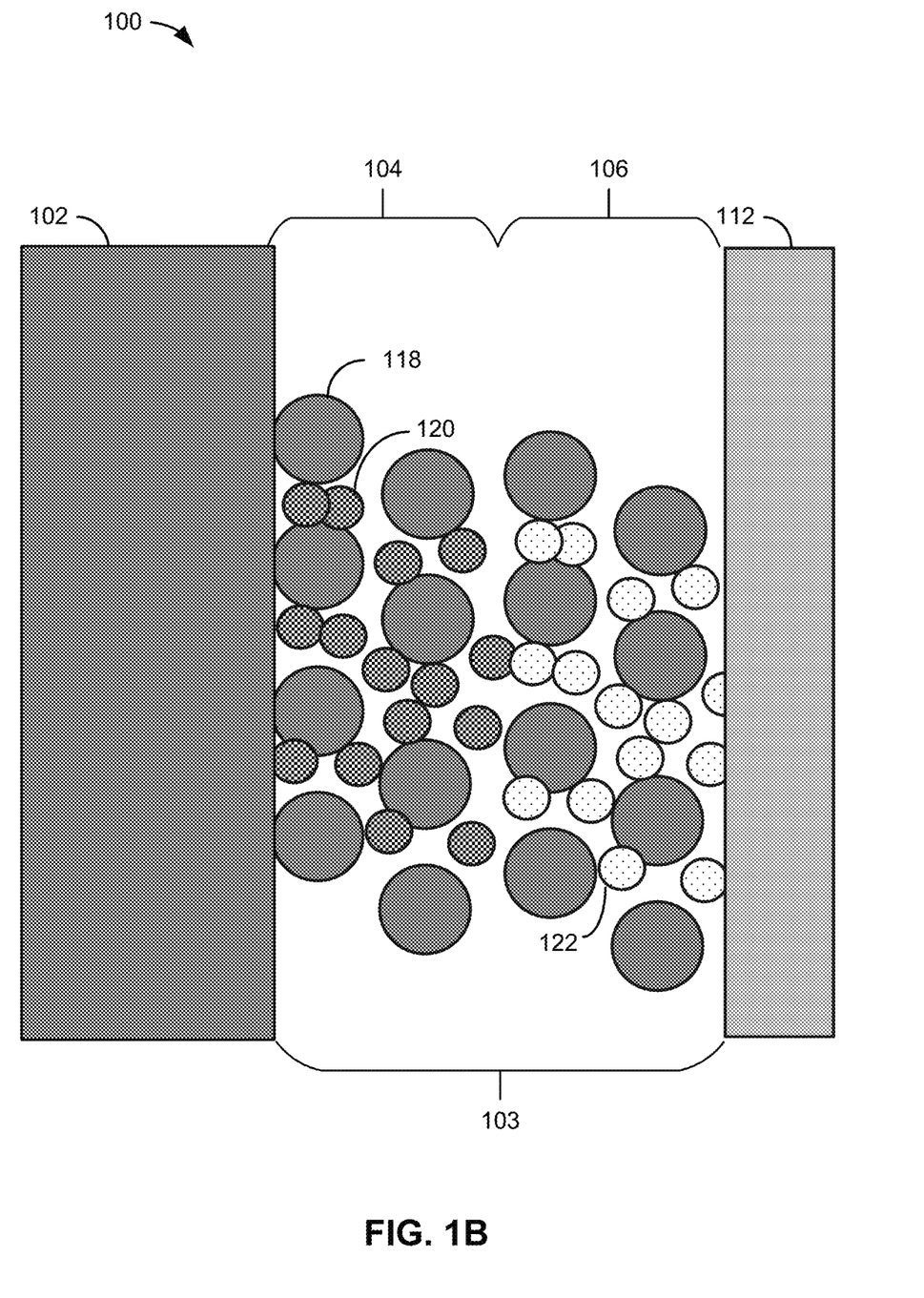
FIG. 1B shows an enlarged view of the first hybrid electrocatalyst layer shown in FIG. 1A.

The first ion-conducting catalyst layer 104 includes the electrocatalyst described above and an ionomer. The ionomer particles are dispersed throughout the electrocatalyst particles as shown in FIG. 1B and act as a binder. The ionomer comprises the same material as the ion-conducting polymer membrane 102, discussed above. Accordingly, the presence of the ionomer extends the reaction zone of the ion-conducting polymer membrane 102 from a two-dimensional surface into three dimensions. In some embodiments, the ionomer may be a sodium-form ionomer. The sodium-form ionomer comprises the same material as a sodium-form ion-conducting polymer membrane described above. The electrocatalyst in the first ion-conducting catalyst layer 104 may be unsupported or may be supported on a conductive support. The conductive support may comprise a carbon support.

The ionomer may be present in the first ion-conducting catalyst layer 104 in an amount from about 1% to about 20% by weight of the first ion-conducting catalyst layer 104. For example, the ionomer may be present in the first ion-conducting catalyst layer in an amount from about 1% to about 5%, about 1% to about 10%, about 1% to about 15%, about 1% to about 20%, about 5% to about 10%, about 5% to about 15%, about 5% to about 20%, about 10% to about 20%, or about 10% to about 15% by weight of the first ion-conducting catalyst layer. As another example, the ionomer may be present in the first ion-conducting catalyst layer in an amount of about 1%, about 2%, about 3%, about 4%, about 5%, about 6%, about 7%, about 8%, about 9%, about 10%, about 11%, about 12%, about 13%, about 14%, about 15%, about 16%, about 17%, about 18%, about 19%, or about 20% by weight of the first ion-conducting catalyst layer.

The ionomer may be present in the first ion-conducting catalyst layer 104 in an amount from about 30% to about 40% by volume, such as about 30% by volume, about 35% by volume, or about 40% by volume.

The electrocatalyst may be present in the first ion-conducting catalyst layer 104 in an amount from about 80% to about 99% by weight of the first ion-conducting catalyst layer 104. For example, the electrocatalyst may be present in the first ion-conducting catalyst layer in an amount from about 80% to about 85%, about 80% to about 90%, about 80% to about 95%, about 85% to about 90%, about 85% to about 95%, about 85% to about 99%, about 90% to about 95%, about 90% to about 99%, or about 95% to about 99% by weight of the first ion-conducting catalyst layer. As another example, the electrocatalyst may be present in the first ion-conducting catalyst layer in an amount of about 80%, about 81%, about 82%, about 83%, about 84%, about 85%, about 86%, about 87%, about 88%, about 89%, about 90%, about 91%, about 92%, about 93%, about 94%, about 95%, about 96%, about 97%, about 98%, or about 99% by weight of the first ion-conducting catalyst layer.

In an alternative embodiment, the first ion-conducting catalyst layer 104 may include a support for an electrocatalyst as described above, but that does not include an electrocatalyst. This helps to create a three-dimensional network of the ionomer, conductive support and catalyst through the ion-conducting catalyst layer.

The first ion-conducting catalyst layer 104 may have a porosity from about 10% to about 30%. For example, the first ion-conducting catalyst layer 104 may have a porosity from about 10% to about 15%, about 10% to about 20%, about 10% to about 25%, about 10% to about 30%, about 15% to about 20%, about 15% to about 25%, about 15% to about 30%, about 20% to about 25%, about 20% to about 30%, or about 25% to about 30%. The porosity of the first ion-conducting catalyst layer 104 may be measured by means known to those having ordinary skill in the art.

The first nonionic conductive catalyst layer 106 includes the electrocatalyst described above and a nonconductive binder. The nonconductive binder may comprise a polymer such as polytetrafluoroethylene (PTFE, also known as Teflon®), poly(ether ether ketone) (PEEK), poly(benzimidazole) (PBI), poly(vinylidene fluoride) (PVDF), phenylated poly(phenylene) (PPP), poly(ether sulfone) (PES), polystyrene-b-poly(ethylene-r-butylene)-b-polystyrene (SEBS), mixtures of poly(ethylene oxide) mixed with poly(vinyl alcohol), polystyrene cross-linked with divinyl benzene, poly(ether imide) (PEI), or other nonconductive binders known in the art. The electrocatalyst in the first nonionic conductive catalyst layer 106 may be unsupported or may be supported on a conductive support. The conductive support may comprise a carbon support.

The binder may be present in the first nonionic conductive catalyst layer 106 in an amount from about 1% to about 20% by weight of the first nonionic conductive catalyst layer 106.

For example, the binder may be present in the first nonionic conductive catalyst layer in an amount from about 1% to about 5%, about 1% to about 10%, about 1% to about 15%, about 1% to about 20%, about 5% to about 10%, about 5% to about 15%, about 5% to about 20%, about 10% to about 20%, or about 10% to about 15% by weight of the first nonionic conductive catalyst layer. As another example, the binder may be present in the first nonionic conductive catalyst layer in an amount of about 1%, about 2%, about 3%, about 4%, about 5%, about 6%, about 7%, about 8%, about 9%, about 10%, about 11%, about 12%, about 13%, about 14%, about 15%, about 16%, about 17%, about 18%, about 19%, or about 20% by weight of the first nonionic conductive catalyst layer.

The nonconductive binder may be present in the first nonionic conductive catalyst layer 106 in an amount from about 30% to about 40% by volume, such as about 30% by volume, about 35% by volume, or about 40% by volume.

The electrocatalyst may be present in the first nonionic conductive catalyst layer 106 in an amount from about 80% to about 99% by weight of the first nonionic conductive catalyst layer 106. For example, the electrocatalyst may be present in the first nonionic conductive catalyst layer in an amount from 80% to about 85%, about 80% to about 90%, about 80% to about 95%, about 85% to about 90%, about 85% to about 95%, about 85% to about 99%, about 90% to about 95%, about 90% to about 99%, or about 95% to about 99% by weight of the first nonionic conductive catalyst layer. As another example, the electrocatalyst may be present in the first nonionic conductive catalyst layer in an amount of about 80%, about 81%, about 82%, about 83%, about 84%, about 85%, about 86%, about 87%, about 88%, about 89%, about 90%, about 91%, about 92%, about 93%, about 94%, about 95%, about 96%, about 97%, about 98%, or about 99% by weight of the first nonionic conductive catalyst layer.

The first nonionic conductive catalyst layer 106 may have a porosity from about 10% to about 30%. For example, the first nonionic conductive catalyst layer 106 may have a porosity from about 10% to about 15%, about 10% to about 20%, about 10% to about 25%, about 10% to about 30%, about 15% to about 20%, about 15% to about 25%, about 15% to about 30%, about 20% to about 25%, about 20% to about 30%, or about 25% to about 30%. The porosity of the first nonionic conductive catalyst layer 106 may be measured by means known to those having ordinary skill in the art.

In an alternative embodiment, the first nonionic conductive catalyst layer 106 may include a support for an electrocatalyst as described above, but that does not include an electrocatalyst. This helps to create a three-dimensional network of the binder, conductive support and catalyst through the nonionic conductive catalyst layer.

In some embodiments, the ion-conducting catalyst layers may include a nonionic conductive binder and the nonionic conductive catalyst layers may include an ionomer.

The first species diffusion/transport layer 112 is made of an electrically conductive material that is both gas-permeable and liquid-permeable. Methods of making and procuring species diffusion/transport layers are generally known to those having ordinary skill in the art.

FIG. 1B shows an expanded view of the first hybrid electrocatalyst layer 103. As can be seen in FIG. 1B, the electrocatalyst particles 118 are present through the thickness of the first hybrid electrocatalyst layer 103. The first ion-conducting catalyst layer 104 includes ionomer particles 120 that extend through the thickness of the first ion-conducting catalyst layer 104. The first nonionic conductive catalyst layer 106 includes nonconductive binder particles 122 that extend through the thickness of the first nonionic conductive catalyst layer 106.

Returning to FIG. 1A, the second hybrid electrocatalyst layer 107 has a first surface 134 and a second surface 135 opposite to the first surface 134. The first surface 134 contacts the second surface 131 of the ion-conducting polymer membrane 102 and the second surface 135 contacts the second species diffusion/transport layer 114. As shown in FIG. 1A, the second ion-conducting layer 108 contacts the ion-conducting polymer membrane 102 and the second nonionic conductive catalyst layer 110 contacts the second species diffusion/transport layer 114.

The second hybrid electrocatalyst layer 107 includes an electrocatalyst. The electrocatalyst is present in both the second ion-conducting catalyst layer 108 and the second nonionic conductive catalyst layer 110. The electrocatalyst particles closest to the ion-conducting polymer membrane 102 participate in the electrochemical reaction at the ion-conducting polymer membrane 102, the electrocatalyst particles furthest from the ion-conducting polymer membrane 102 (i.e., the electrocatalyst particles closest to the second species diffusion/transport layer 114) do not participate in the electrochemical reaction and instead act simply as an electronic conductor/chemical catalyst. This section of the electrocatalyst layer also catalyzes the transformation of undesirable chemicals into benign compounds. For example, the electrocatalyst may decompose peroxides that may form in the nonionic conductive catalyst layer to water and oxygen. Additionally, the electrocatalyst may help form aldehydes formed at the nonionic conductive catalyst layer from the reduction of carbon dioxide, carbon monoxide, and hydrogen in the ion-conducting layer.

The electrocatalyst may include platinum in the form of platinum black, alloyed transition metals, transition metals coupled with a source of carbon or nitrogen, or a combination thereof. The alloyed transition metals may include titanium, vanadium, iron, cobalt, nickel, copper, zinc, zirconium, ruthenium, rhodium, silver, palladium, gold, or other transition metals known in the art.

The electrocatalyst in the second hybrid electrocatalyst layer 107 may be unsupported or may be supported on a conductive support. The conductive support may comprise a carbon support or a metal oxide support, such as an antimony-tin oxide, an indium-tin oxide, or sub-stoichiometric oxides of titanium.

The second ion-conducting catalyst layer 108 includes the electrocatalyst described above and an ionomer. The ionomer particles are dispersed throughout the electrocatalyst particles as shown in FIG. 1B with respect to the first ion-conducting layer 104 and act as a binder. The ionomer comprises the same material as the ion-conducting polymer membrane 102, discussed above. Accordingly, the presence of the ionomer extends the reaction zone of the ion-conducting polymer membrane 102 from a two-dimensional surface into three dimensions. The electrocatalyst in the second ion-conducting catalyst layer 108 may be unsupported or may be supported on a conductive support. The conductive support may comprise a carbon support or a metal oxide support, such as an antimony-tin oxide, an indium-tin oxide, or sub-stoichiometric oxides of titanium.

The ionomer may be present in the second ion-conducting catalyst layer 108 in an amount from about 1% to about 20% by weight of the second ion-conducting catalyst layer 108. For example, the ionomer may be present in the second ion-conducting catalyst layer in an amount from about 5% to about 10%, about 5% to about 15%, about 5% to about 20%, about 10% to about 20%, or about 10% to about 15% by weight of the second ion-conducting catalyst layer. As another example, the ionomer may be present in the second ion-conducting catalyst layer in an amount of about 1%, about 2%, about 3%, about 4%, about 5%, about 6%, about 7%, about 8%, about 9%, about 10%, about 11%, about 12%, about 13%, about 14%, about 15%, about 16%, about 17%, about 18%, about 19%, or about 20% by weight of the second ion-conducting catalyst layer.

The ionomer may be present in the second ion-conducting catalyst layer 108 in an amount from about 30% to about 40% by volume, such as about 30% by volume, about 35% by volume, or about 40% by volume.

The electrocatalyst may be present in the second ion-conducting catalyst layer 108 in an amount from about 80% to about 99% by weight of the second ion-conducting catalyst layer 108. For example, the electrocatalyst may be present in the second ion-conducting catalyst layer in an amount from about 80% to about 85%, about 80% to about 90%, about 80% to about 95%, about 85% to about 90%, about 85% to about 95%, about 85% to about 99%, about 90% to about 95%, about 90% to about 99%, or about 95% to about 99% by weight of the second ion-conducting catalyst layer. As another example, the electrocatalyst may be present in the second ion-conducting catalyst layer in an amount of about 80%, about 81%, about 82%, about 83%, about 84%, about 85%, about 86%, about 87%, about 88%, about 89%, about 90%, about 91%, about 92%, about 93%, about 94%, about 95%, about 96%, about 97%, about 98%, or about 99% by weight of the second ion-conducting catalyst layer.

The second ion-conducting catalyst layer 108 may have a porosity from about 10% to about 30%. For example, the first ion-conducting catalyst layer 108 may have a porosity from about 10% to about 15%, about 10% to about 20%, about 10% to about 25%, about 10% to about 30%, about 15% to about 20%, about 15% to about 25%, about 15% to about 30%, about 20% to about 25%, about 20% to about 30%, or about 25% to about 30%. The porosity of the second ion-conducting catalyst layer 108 may be measured by means known to those having ordinary skill in the art.

In an alternative embodiment, the second ion-conducting catalyst layer 108 may include a support for an electrocatalyst as described above, but that does not include an electrocatalyst. This helps to create a three-dimensional network of the binder, conductive support and catalyst through the ion-conducting catalyst layer.

The second nonionic conductive catalyst layer 110 includes the electrocatalyst described above and a nonconductive binder. The nonconductive binder may comprise a polymer such as polytetrafluoroethylene (PTFE, also known as Teflon®), poly(ether ether ketone) (PEEK), poly(benzimidazole) (PBI), poly(vinylidene fluoride) (PVDF), phenylated poly(phenylene) (PPP), poly(ether sulfone) (PES), polystyrene-b-poly(ethylene-r-butylene)-b-polystyrene (SEBS), mixtures of poly(ethylene oxide) mixed with poly(vinyl alcohol), polystyrene cross-linked with divinyl benzene, poly(ether imide) (PEI), or other nonconductive binders known in the art. The electrocatalyst in the second nonionic conductive catalyst layer 110 may be unsupported or may be supported on a conductive support. The conductive support may comprise a carbon support or a metal oxide support, such as an antimony-tin oxide, an indium-tin oxide, or sub-stoichiometric oxides of titanium.

The binder may be present in the second nonionic conductive catalyst layer 110 in an amount from about 1% to about 20% by weight of the second nonionic conductive catalyst layer 110. For example, the binder may be present in the second nonionic conductive catalyst layer in an amount from about 1% to about 5%, about 1% to about 10%, about 1% to about 15%, about 1% to about 20%, about 5% to about 10%, about 5% to about 15%, about 5% to about 20%, about 10% to about 20%, or about 10% to about 15% by weight of the second nonionic conductive catalyst layer. As another example, the binder may be present in the second nonionic conductive catalyst layer in an amount of about 1%, about 2%, about 3%, about 4%, about 5%, about 6%, about 7%, about 8%, about 9%, about 10%, about 11%, about 12%, about 13%, about 14%, about 15%, about 16%, about 17%, about 18%, about 19%, or about 20% by weight of the second nonionic conductive catalyst layer.

The nonconductive binder may be present in the second nonionic conductive catalyst layer 110 in an amount from about 30% to about 40% by volume, such as about 30% by volume, about 35% by volume, or about 40% by volume.

The electrocatalyst may be present in the second nonionic conductive catalyst layer 110 in an amount from about 80% to about 99% by weight of the second nonionic conductive catalyst layer 110. For example, the electrocatalyst may be present in the second nonionic conductive catalyst layer in an amount from about 80% to about 85%, about 80% to about 90%, about 80% to about 95%, about 85% to about 90%, about 85% to about 95%, about 85% to about 99%, about 90% to about 95%, about 90% to about 99%, or about 95% to about 99% by weight of the second nonionic conductive catalyst layer. As another example, the electrocatalyst may be present in the second nonionic conductive catalyst layer in an amount of about 80%, about 81%, about 82%, about 83%, about 84%, about 85%, about 86%, about 87%, about 88%, about 89%, about 90%, about 91%, about 92%, about 93%, about 94%, about 95%, about 96%, about 97%, about 98%, or about 99% by weight of the second nonionic conductive catalyst layer.

The second nonionic conductive catalyst layer 110 may have a porosity from about 10% to about 30%. For example, the second nonionic conductive catalyst layer 110 may have a porosity from about 10% to about 15%, about 10% to about 20%, about 10% to about 25%, about 10% to about 30%, about 15% to about 20%, about 15% to about 25%, about 15% to about 30%, about 20% to about 25%, about 20% to about 30%, or about 25% to about 30%. The porosity of the second nonionic conductive catalyst layer 110 may be measured by means known to those having ordinary skill in the art.

In an alternative embodiment, the second nonionic conductive catalyst layer 110 may include a support for an electrocatalyst as described above, but that does not include an electrocatalyst. This helps to create a three-dimensional network of the binder, conductive support and catalyst through the nonionic conductive catalyst layer.

The second species diffusion/transport layer 114 is made of an electrically conductive material that is both gas-permeable and liquid-permeable. Methods of making and procuring species diffusion/transport layers are generally known to those having ordinary skill in the art.

Figure 1C:
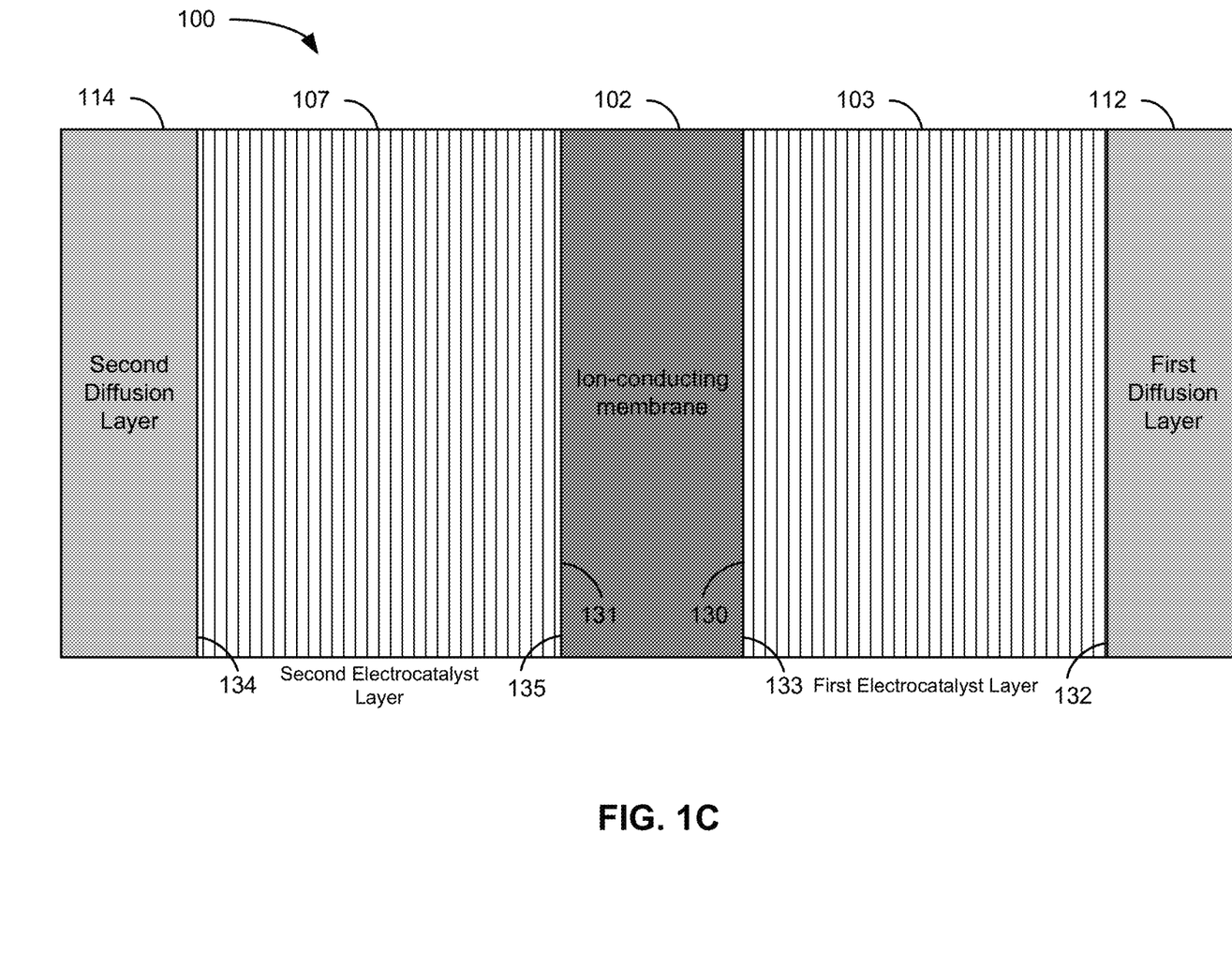
FIG. 1C shows a diagram of an electrochemical cell of the present disclosure.

FIG. 1C shows another embodiment of the electrochemical cell 100 of the present disclosure, wherein each of the first hybrid electrocatalyst layer 103 and the second hybrid electrocatalyst layer 107 includes a plurality of ion-conducting catalyst layers and a plurality of nonionic conductive catalyst layers. Thus, a hybrid electrocatalyst layer of the present disclosure may include more than 2 ion-conducting catalyst layers, more than 5 ion-conducting catalyst layers, more than 10 ion-conducting catalyst layers, more than 20 ion-conducting catalyst layers, more than 50 ion-conducting catalyst layers, and so on. Likewise, a hybrid electrocatalyst layer of the present disclosure may include more than 2 nonionic conductive catalyst layers, more than 5 nonionic conductive catalyst layers, more than 10 nonionic conductive catalyst layers, more than 20 nonionic conductive catalyst layers, more than 50 nonionic conductive catalyst layers, and so on.

Each of the plurality of ion-conducting catalyst layers may include differing amounts of ionomer and catalyst such that a concentration gradient of the ionomer is formed. This concentration gradient may increase or decrease through the thickness of the hybrid electrocatalyst layer, i.e., in a direction from the ion-conducting polymer membrane 102 to one of the species diffusion/transport layers (also referred to herein as the "Z-direction"). Alternatively, or additionally, the ionomer concentration gradient may increase or decrease along the length and/or width of the hybrid electrocatalyst layer as viewed in a cross-section of the hybrid electrocatalyst layer (also referred to herein as "the X-Y plane").

Likewise, each of the plurality of nonionic conductive catalyst layers may include differing amounts of nonconductive binder and catalyst such that a concentration gradient of the nonconductive binder is formed. This concentration gradient may increase or decrease along the Z-direction or along the X-Y plane as described above with respect to the ionomer concentration gradient.

Additionally or alternatively, each of the plurality of ion-conducting catalyst layers and nonionic conductive catalyst layers may have a porosity gradient in the Z-direction or in the X-Y plane. For example, the porosity of the hybrid electrocatalyst layer may increase or decrease along the Z-direction or along the X-Y plane.

These concentration gradients and porosity gradients have beneficial effects on the functioning of the electrochemical cell and can be tuned to meet the specific requirements of the cell.

The electrochemical cells of the present disclosure may be particularly suited for use in electrolyzers, electrochemical hydrogen pumps, electrochemical cell-based ammonia synthesis, electrochemical cell-based $CO_2$ electroreduction, and other applications.

When used in electrolyzers, the cathode side of the electrochemical cells of the present disclosure may improve the reaction of oxygen that diffuses with hydrogen, thereby reducing oxygen reduction that leads to the formation of peroxides and peroxide radicals. This avoids damage to the polymeric membrane and thus improves the life of the electrochemical cell.

When used in hydrogen pumps, the anode side of the electrochemical cell is more tolerant to hydrogen starvation. In instances where carbon monoxide is provided in the feed to the hydrogen pump, the hybrid electrocatalyst layer provides in situ carbon monoxide tolerance through chemical peroxidation. On both the anode and cathode sides, the outer layers of the electrochemical cells of the present disclosure improve decomposition of peroxy radicals.

When used in gas/gas cell-based ammonia synthesis, the anode side of the electrochemical cell is more tolerant to hydrogen starvation similar to the hydrogen pumps described above. On the cathode side, the outer layers of the electrochemical cell can be designed to draw out the ammonia synthesized by, e.g., incorporating Prussian blue analogues such as copper hexacyanoferrate or nickel hexacyanoferrate onto the surface of a cation exchange membrane. This may be accomplished by adding host materials having affinity to exchange ammonium ions and releasing ammonia on the flow-field side.

When used in gas/gas cell-based carbon dioxide electroreduction, the anode side of the electrochemical cell is more tolerant to hydrogen starvation similar to the hydrogen pumps described above. On the cathode side, the outer layers of the electrochemical cell can be designed to carry out downstream reactions in situ. For example, carbon monoxide and hydrogen may react to form formaldehyde when catalyzed by a catalyst comprising, e.g., ruthenium or an alloy of ruthenium and nickel.

II. Processes for Making the Electrochemical Cells

Further provided herein are processes for making the electrochemical cells described in Section I above. The processes may be used to make any of the electrochemical cells described in Section I.

Figure 2A:
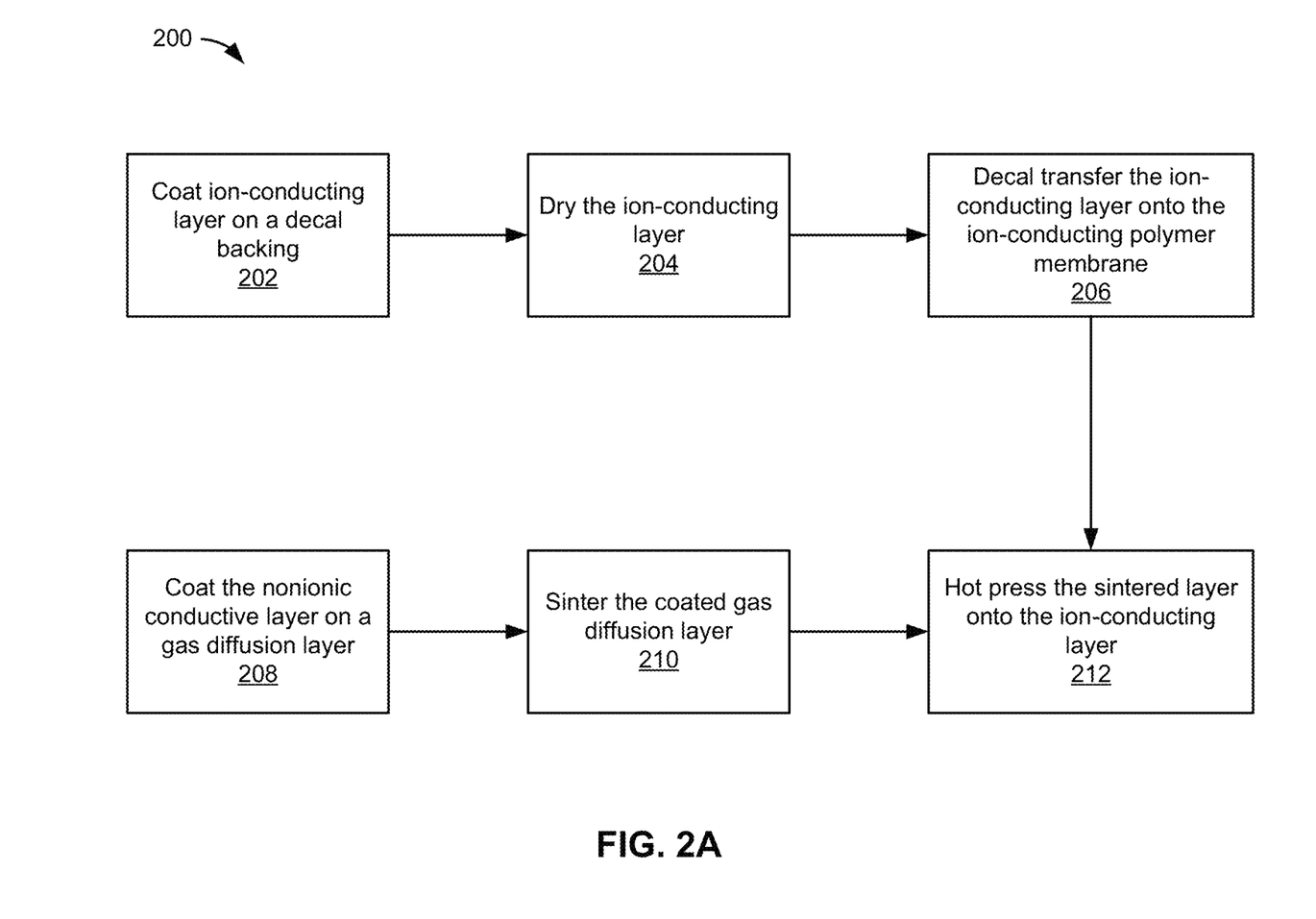
FIG. 2A shows a process for making the hybrid electrocatalyst layers described herein.

Referring now to FIG. 2A, a process 200 of the present disclosure includes the following steps: step 202 coating an ion-conducting catalyst layer onto a decal backing; step 204 drying the ion-conducting catalyst layer on the decal backing, thereby forming an ion-conducting catalyst layer with a decal backing; step 206 transferring the ion-conducting catalyst layer onto an ion-conducting polymer membrane; step 208 coating a nonionic conductive catalyst layer on a species diffusion/transport layer; step 210 sintering the coated species diffusion/transport layer to form a nonionic conductive catalyst layer and species diffusion/transport layer; and step 212 hot pressing the sintered layer onto the ion-conducting catalyst layer, thereby forming an electrochemical cell of the present disclosure. This process creates one hybrid electrocatalyst layer for one side of the electrochemical cell. Those having skill in the art will appreciate that the process may be repeated to create the hybrid electrocatalyst layer of the opposite side of the cell.

Although the numbering is sequential, those having skill in the art will appreciate that step 202, step 204 and step 206 may occur before, after, or simultaneously with step 208 and step 210. Those having skill in the art will also appreciate that step 202 and step 204 may be repeated to create a hybrid electrocatalyst layer with multiple ion-conducting layers; likewise, step 208 and step 210 may be repeated to create a hybrid electrocatalyst layer with multiple nonionic conductive catalyst layers.

In step 202, an ion-conducting catalyst layer is coated onto a decal backing. The ion-conducting slurry includes an electrocatalyst and an ionomer dispersed in a solvent. The electrocatalyst and the ionomer are described above in Section I. The choice of solvent is not limited so long as the solvent does not chemically react with the electrocatalyst or ionomer particles, which may hinder cell performance. For example, the solvent may include an alcohol-based solvent, such as glycol or glycerol. Those having ordinary skill in the art will be capable of selecting an appropriate solvent.

The decal backing may be a glass fiber layer coated with a polymer such as PTFE to easily release from the coated layers.

The coating may be accomplished by any method known in the art, such as dip coating, blade coating, spin coating, roll coating, rod coating, slot die coating, spray coating, ultrasonic spray coating, and other methods known in the art. In some embodiments, a 3D printable or inkjet coating method may be used to control the concentration and/or porosity of the ion-conducting layer in an X-Y direction.

After the ion-conducting layer is coated onto the decal backing, the process 200 proceeds to step 204. In step 204, the ion-conducting catalyst layer coated on the decal backing is dried. The drying may be accomplished, for example, by using an electric heater, a convection oven, or an infrared heater. The drying may be accomplished at elevated temperature to rapidly evaporate the solvent. The drying temperature may be from about 80° C. to about 120° C., such as from about 100° C. to about 120° C. The drying may be accomplished at atmospheric pressures or under vacuum. The drying may also be accomplished in an inert atmosphere.

Figure 2B:
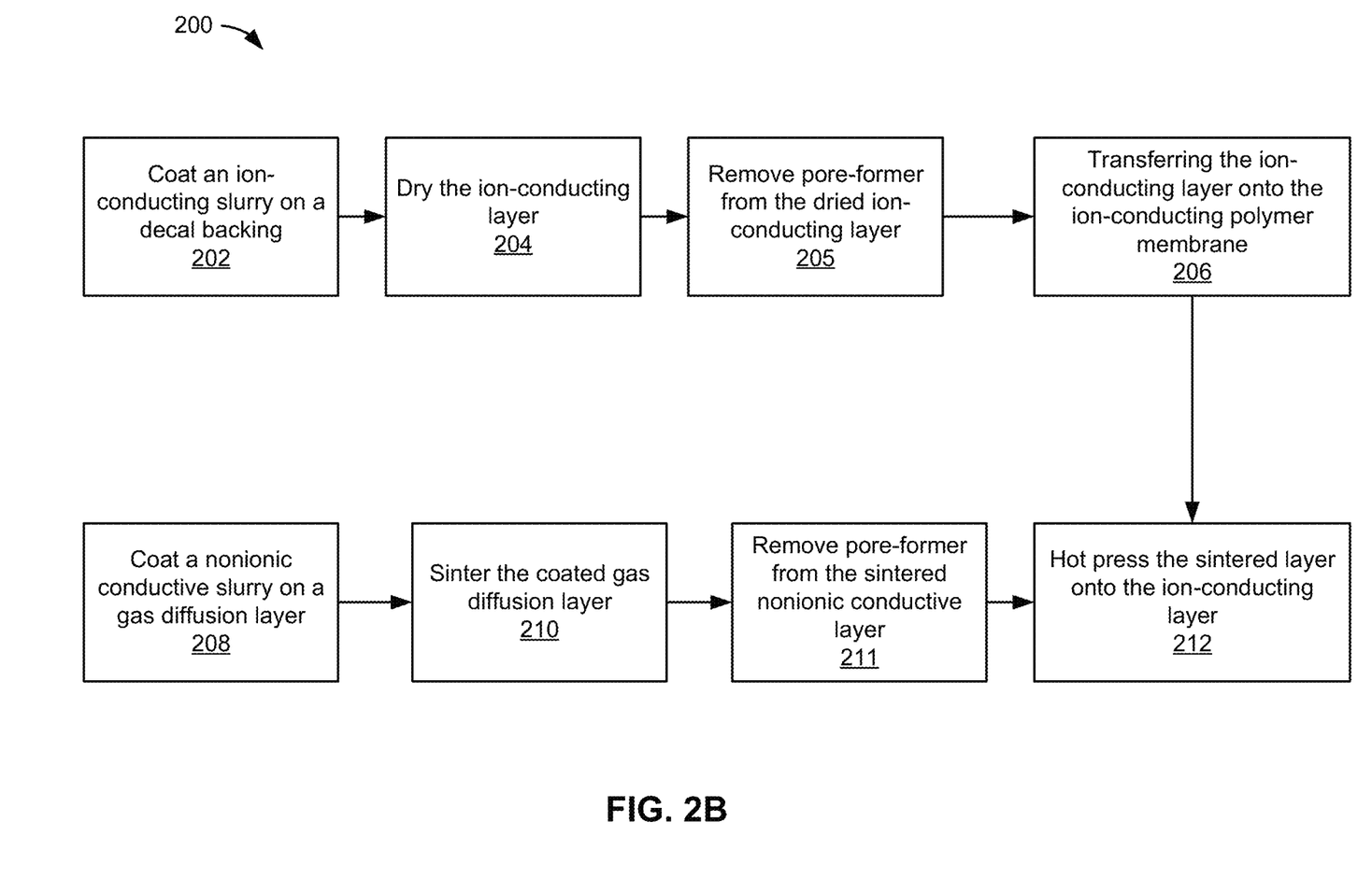
FIG. 2B shows a process for making the hybrid electrocatalyst layers described herein.

Turning now to FIG. 2B, the ion-conducting slurry may include a pore-former composition to increase the porosity of the ion-conducting layer in the electrochemical cell. Pore-formers suitable for use in the present disclosure include polystyrene and derivatives of polystyrene, polyethylene oxide and derivatives of polyethylene oxide, polyvinylidene fluorine and derivatives of polyvinylidene fluorine, carbon black, silica, polyacrylic acid, N-(2-hydroxypropyl) meth acrylamide (HPMA), polyacrylamide (PAM), and combinations thereof. The pore-former may have an average particle diameter from about 50 nm to about 1000 nm. The amount of pore-former included in the ion-conducting slurry will correlate to the porosity of the ion-conducting layer. In embodiments where a pore-former is used, when the ion-conducting layer is dried in step 204, the process continues to step 205.

Step 205 includes removing the pore-former from the ion-conducting layer. Removing the pore-former is accomplished by soaking the ion-conducting layer in a removal solvent that is capable of dissolving the pore-former without dissolving or otherwise chemically reacting with the decal backing, the ionomer, or the catalyst. The removal solvent may include a polar organic solvent, a non-polar organic solvent, an aqueous solvent, or a combination thereof. In some examples, the removal solvent may include a hydrocarbon solvent such as toluene or xylenes (including meta-, ortho-, and para xylene), acetone, methanol, water, etc. Alternatively, the pore former may be removed by heating the ion-conducting layer to a temperature that melts or vaporizes the pore-former without damaging the remaining structure.

Returning to FIG. 2A, after the ion-conducting catalyst layer is dried, the process 200 proceeds to step 206. Step 206 includes transferring the ion-conducting catalyst layer onto the ion-conducting polymer membrane. The transferring step may be accomplished by hot pressing the ion-conducting catalyst layer onto the ion-conducting polymer membrane. The hot pressing adheres the ion-conducting catalyst layer onto the ion-conducting polymer membrane, and also releases the decal backing from the ion-conducting layer. The hot pressing of step 206 may be performed at a temperature from about 80° C. to about 140° C., such as from about 100° C. to about 140° C., or from about 125° C. to about 140° C. The hot pressing may be performed at a pressure of about 70 psi to about 150 psi.

In step 208, a nonionic conductive slurry is coated onto a species diffusion/transport layer. The species diffusion layer may be the species diffusion layer described above in Section I. The nonionic conductive slurry includes an electrocatalyst and a nonionic conductive binder dispersed in a solvent. The electrocatalyst and the nonionic conductive binder are described above in Section I. The choice of solvent is not limited so long as the solvent does not chemically react with the electrocatalyst or nonionic conductive binder particles, which may hinder cell performance. For example, the solvent may include an alcohol-based solvent, such as glycol or glycerol. Those having ordinary skill in the art will be capable of selecting an appropriate solvent.

The coating may be accomplished by any method known in the art, such as dip coating, blade coating, spin coating, roll coating, rod coating, slot die coating, spray coating, ultrasonic spray coating, and other methods known in the art. In some embodiments, a 3D printable or inkjet coating method may be used to control the concentration and/or porosity of the nonionic conductive catalyst layer in an X-Y direction.

After the nonionic conductive catalyst layer is coated onto the species diffusion/transport layer, the process 200 proceeds to step 210. In step 210, the nonionic conductive catalyst layer coated on the species diffusion layer is sintered. The sintering may be accomplished using methods and apparatuses known in the art, such as heating in a convection oven or infrared heating. The sintering may be accomplished at elevated temperature, such as from about 300° C. to about 400° C. Preferably, the sintering is conducted above the glass transition temperature of the nonionic conductive binder. The sintering step is critical, as the nonionic conductive binder particles can peel or crumble off of the nonionic conductive catalyst layer if not sintered. The sintering improves the adhesive and cohesive properties of the particles and increases durability of the nonionic conductive catalyst layer. The sintering may also be accomplished in an inert atmosphere.

Turning now to FIG. 2B, the nonionic conductive slurry may include a pore-former composition to increase the porosity of the nonionic conductive catalyst layer in the electrochemical cell. Pore-formers suitable for use are described above. The amount of pore-former included in the nonionic conductive slurry will correlate to the porosity of the nonionic conductive catalyst layer. In embodiments where a pore-former is used, when the nonionic conductive catalyst layer is sintered in step 210, the process continues to step 211. Step 211 includes removing the pore-former from the nonionic conductive catalyst layer. Removing the pore-former is accomplished by soaking the nonionic conductive catalyst layer in a removal solvent that is capable of dissolving the pore-former without dissolving or otherwise chemically reacting with the decal backing, the nonionic conductive binder, or the catalyst. Removal solvents suitable for use are described above.

Returning to FIG. 2A, after the nonionic conductive catalyst layer is sintered, the process 200 proceeds to step 212. Step 212 includes hot pressing the sintered layer onto the ion-conducting catalyst layer, which has already been transferred onto the ion-conducting polymer membrane in step 206. The hot pressing of step 212 may be performed at a temperature from about 80° C. to about 140° C., such as from about 100° C. to about 140° C., or from about 125° C. to about 140° C. The hot pressing may be performed at a pressure of about 70 psi to about 150 psi.

As noted above, the process 200 may be repeated to create the opposite side of the electrochemical cell.

Figure 3A:
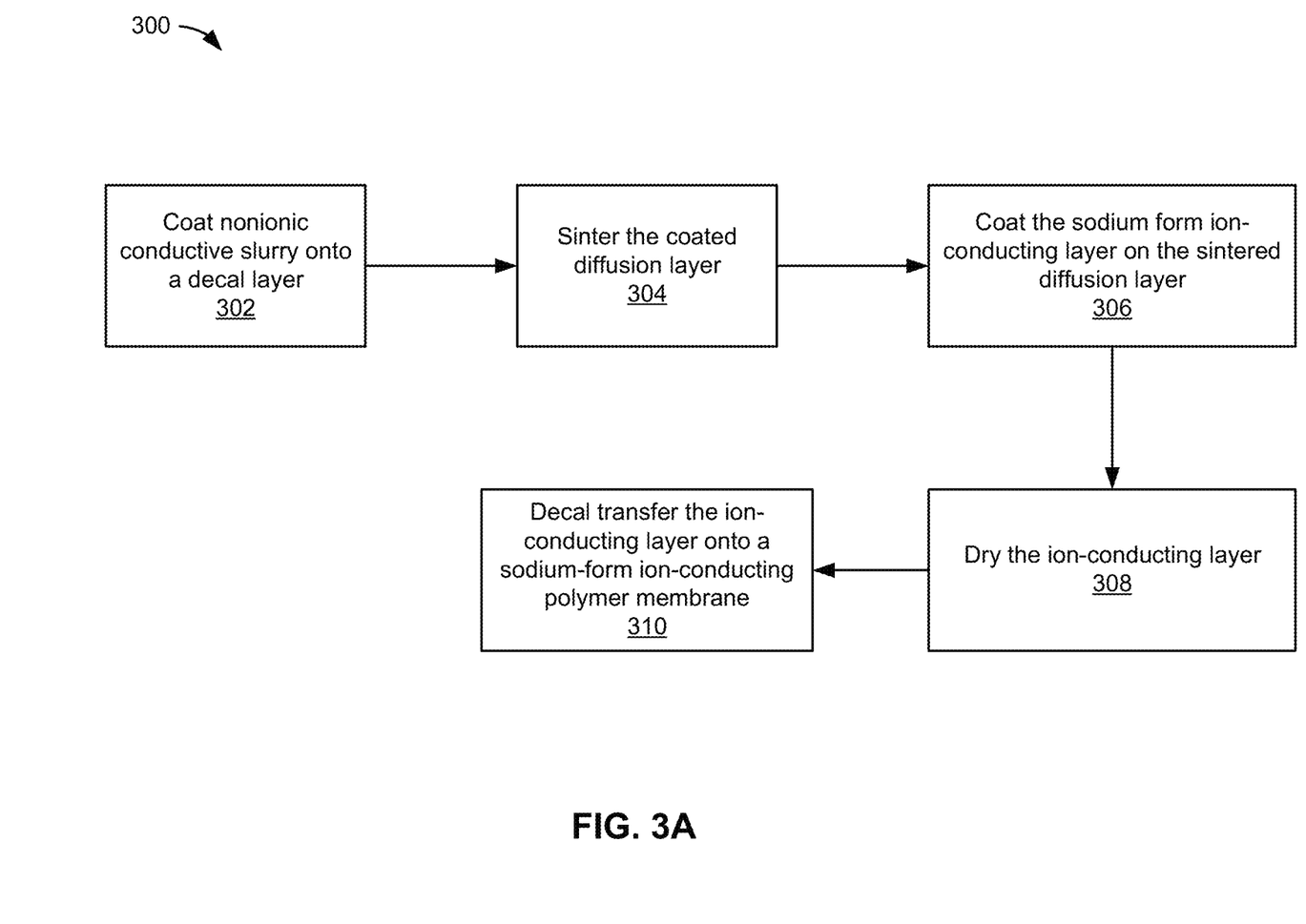
FIG. 3A shows a process for making the hybrid electrocatalyst layers described herein.

Referring now to FIG. 3A, another process 300 of the present disclosure is described. The process 300 includes: step 302 coating a nonionic conductive slurry on a species diffusion/transport layer; step 304 sintering the coated species diffusion layer; step 306 coating a sodium-form ion-conducting layer on a decal layer; step 308 drying the ion-conducting catalyst layer; and step 310 transferring the ion-conducting catalyst layer onto a sodium-form ion-conducting polymer membrane. Those having skill in the art will also appreciate that step 302 and step 304 may be repeated to create a hybrid electrocatalyst layer with multiple nonionic conductive catalyst layers; likewise, step 306 and step 308 may be repeated to create a hybrid electrocatalyst layer with multiple ion-conducting catalyst layers.

In step 302, a nonionic conductive slurry is coated onto a decal layer. The species diffusion/transport layer may be the species diffusion/transport layer described above in Section I. The nonionic conductive slurry includes an electrocatalyst and a nonionic conductive binder dispersed in a solvent. The electrocatalyst and the nonionic conductive binder are described above in Section I. The choice of solvent is not limited so long as the solvent does not chemically react with the electrocatalyst or nonionic conductive binder particles, which may hinder cell performance. Those having ordinary skill in the art will be capable of selecting an appropriate solvent.

The coating may be accomplished by any method known in the art, such as dip coating, blade coating, spin coating, roll coating, rod coating, slot die coating, spray coating, ultrasonic spray coating, and other methods known in the art. In some embodiments, a 3D printable or inkjet coating method may be used to control the concentration and/or porosity of the nonionic conductive catalyst layer in an X-Y direction.

After the nonionic conductive catalyst layer is coated onto the decal layer, the process 300 proceeds to step 304. In step 304, the nonionic conductive catalyst layer coated on the species diffusion layer is sintered. The sintering may be accomplished using methods and apparatuses known in the art, such as heating in a convection oven or infrared heating. The sintering may be accomplished at elevated temperature, such as from about 300° C. to about 400° C. The sintering improves the adhesive and cohesive properties of the particles and increases durability of the nonionic conductive catalyst layer. The sintering may also be accomplished in an inert atmosphere.

Figure 3B:
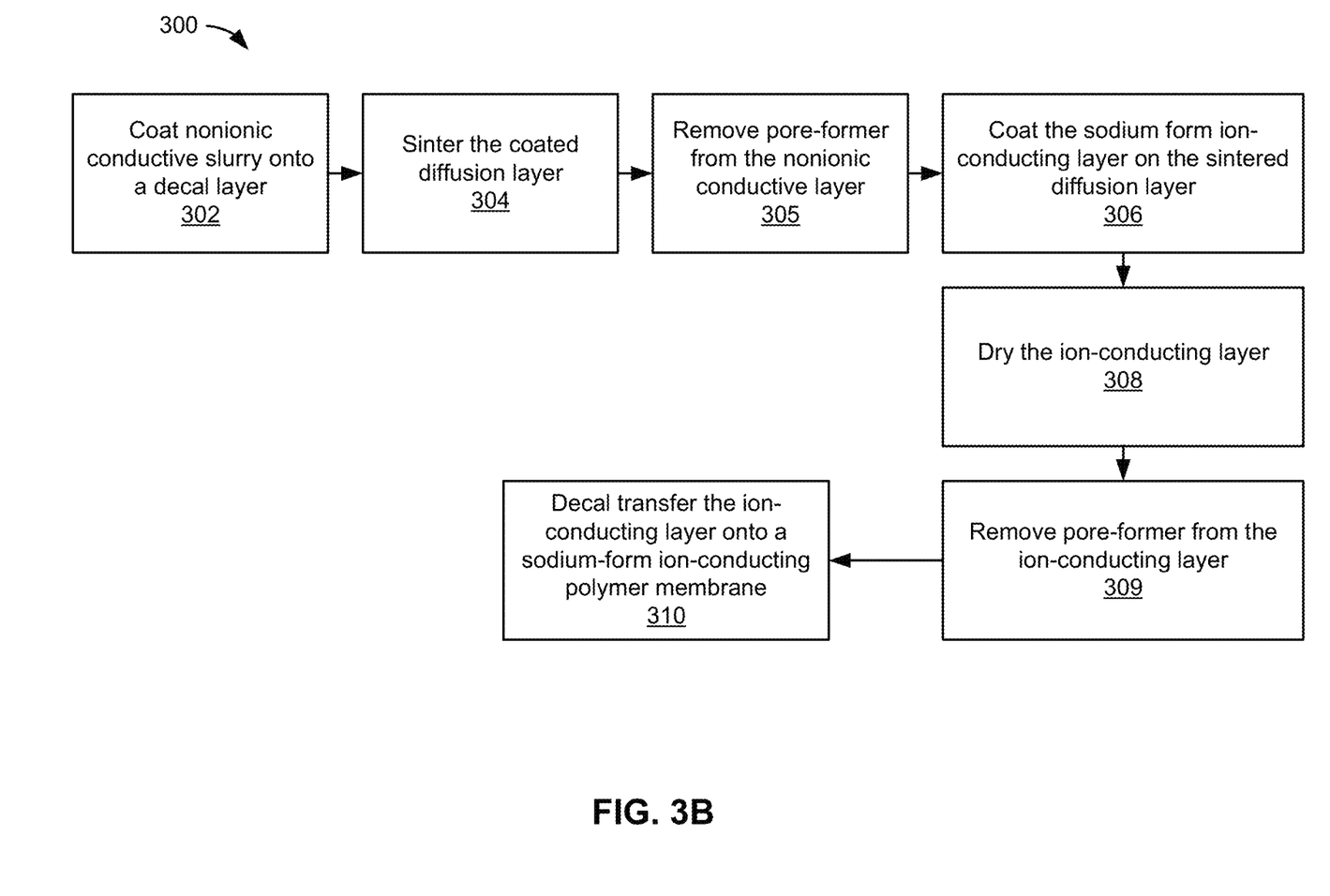
FIG. 3B shows a process for making the hybrid electrocatalyst layers described herein.

Turning now to FIG. 3B, the nonionic conductive slurry may include a pore-former composition to increase the porosity of the nonionic conductive catalyst layer in the electrochemical cell. Pore-formers suitable for use are described above. The amount of pore-former included in the nonionic conductive slurry will correlate to the porosity of the nonionic conductive catalyst layer. In embodiments where a pore-former is used, when the nonionic conductive catalyst layer is sintered in step 304, the process continues to step 305. Step 305 includes removing the pore-former from the nonionic conductive catalyst layer. Removing the pore-former is accomplished by soaking the nonionic conductive catalyst layer in a removal solvent that is capable of dissolving the pore-former without dissolving or otherwise chemically reacting with the decal layer, the nonionic conductive binder, or the catalyst. Removal solvents suitable for use are described above.

Returning now to FIG. 3A, at step 306, a sodium-form ion-conducting slurry is coated on the sintered species diffusion/transport layer formed in step 304. The sodium-form ion-conducting slurry includes an electrocatalyst and a sodium-form ionomer dispersed in a solvent. The electrocatalyst and the sodium-form ionomer are described above in Section I.

The coating may be accomplished by any method known in the art, such as dip coating, blade coating, spin coating, roll coating, rod coating, slot die coating, spray coating, ultrasonic spray coating, and other methods known in the art. In some embodiments, a 3D printable or inkjet coating method may be used to control the concentration and/or porosity of the ion-conducting layer in an X-Y direction.

Next, at step 308, the ion-conducting catalyst layer is dried such that it adheres to the nonionic conductive catalyst layer. The drying may be accomplished, for example, by using an oven. The drying may be accomplished at elevated temperature, such as from about 60° C. to about 125° C., such as from about 80° C. to about 125° C., or from about 100° C. to about 125° C. The drying may be accomplished at atmospheric pressures or under vacuum. The drying may also be accomplished in an inert atmosphere.

Turning now to FIG. 3B, the ion-conducting slurry may include a pore-former composition to increase the porosity of the nonionic conductive catalyst layer in the electrochemical cell. Pore-formers suitable for use are described above. The amount of pore-former included in the nonionic conductive slurry will correlate to the porosity of the nonionic conductive catalyst layer. In embodiments where a pore-former is used, when the ion-conducting layer is dried in step 308, the process continues to step 309. Step 309 includes removing the pore-former from the ion-conducting layer. Removing the pore-former is accomplished by soaking the ion-conducting layer in a removal solvent that is capable of dissolving the pore-former without dissolving or otherwise chemically reacting with the decal backing, the ionomer, or the catalyst. Removal solvents suitable for use are described above.

Returning to FIG. 3A, at step 310, the ion-conducting catalyst layer and nonionic conductive catalyst layer are transferred to an ion-conducting polymer membrane. The transferring step may be accomplished by hot pressing the ion-conducting layer onto the ion-conducting polymer membrane. The hot pressing adheres the ion-conducting layer onto the ion-conducting polymer membrane, and also releases the decal backing from the nonionic conductive catalyst layer. The hot pressing may be performed at a temperature from about 80° C. to about 140° C., such as from about 100° C. to about 140° C., or from about 125° C. to about 140° C. The hot pressing may be performed at a pressure of about 70 psi to about 150 psi.

Concentrations, amounts, and other numerical data may be expressed or presented herein in a range format. It is to be understood that such a range format is used merely for convenience and brevity and should be interpreted flexibly to include not only the numerical values explicitly recited as the limits of the range, but also to include all the individual numerical values or sub-ranges encompassed within that range as if each numerical value and sub-range is explicitly recited. As an illustration, a numerical range of "about 2 to about 50" should be interpreted to include not only the explicitly recited values of 2 to 50, but also include all individual values and sub-ranges within the indicated range. Thus, included in this numerical range are individual values such as 2, 2.4, 3, 3.7, 4, 5.5, 10, 10.1, 14, 15, 15.98, 20, 20.13, 23, 25.06, 30, 35.1, 38.0, 40, 44, 44.6, 45, 48, and sub-ranges such as from 1-3, from 2-4, from 5-10, from 5-20, from 5-25, from 5-30, from 5-35, from 5-40, from 5-50, from 2-10, from 2-20, from 2-30, from 2-40, from 2-50, etc. This same principle applies to ranges reciting only one numerical value as a minimum or a maximum. Furthermore, such an interpretation should apply regardless of the breadth of the range or the characteristics being described.

As used herein, the term "about" is used to provide flexibility to a numerical range endpoint by providing that a given value may be "a little above" or "a little below" the endpoint. For example, the endpoint may be within 10%, 8%, 5%, 3%, 2%, or 1% of the listed value. Further, for the sake of convenience and brevity and in another example, a numerical range of "about 50 mg/mL to about 80 mg/mL"

should also be understood to provide support for the range of "50 mg/mL to 80 mg/mL."

As used herein, the terms "including," "containing," and/or "having" are understood to mean comprising, and are open ended terms.

The indefinite articles "a" and "an," as used herein in the specification and in the claims, unless clearly indicated to the contrary, should be understood to mean "at least one."

ENUMERATED EMBODIMENTS

Embodiment 1: A process for making an electrochemical cell comprising:
- coating an ion-conducting slurry onto a decal layer;
- drying the ion-conducting slurry to form an ion-conducting layer;
- transferring the ion-conducting layer from the decal layer onto an ion-conducting polymer membrane;
- coating a nonionic conductive slurry onto a species diffusion/transport layer to form a coated species diffusion/transport layer;
- sintering the coated diffusion layer to form a nonionic conductive catalyst layer on the species diffusion/transport layer; and
- hot pressing the nonionic conductive catalyst layer onto the ion-conducting layer.

Embodiment 2: The process of embodiment 1, wherein the sintering is performed at a temperature from about 300° C. to about 400° C.

Embodiment 3: The process of embodiment 1 or 2, wherein the ion-conducting slurry comprises a solvent, an ionomer, and an electrocatalyst.

Embodiment 4: The process of any one of embodiments 1-3, wherein the nonionic conductive slurry comprises a solvent, a nonionic conductive binder, and an electrocatalyst.

Embodiment 5: The process of any one of embodiments 1-4, wherein the hot pressing is conducted at a pressure from about 70 psi to about 150 psi and temperature from about 80° C. to about 140° C.

Embodiment 6: The process of any one of embodiments 1-5, wherein the decal layer comprises a glass fiber layer coated with polytetrafluoroethylene.

Embodiment 7: The process of any one of embodiments 1-6, wherein the ion-conducting polymer membrane comprises a perfluorosulfonic acid-based polymer.

Embodiment 8: The process of any one of embodiments 1-7, wherein the ion-conducting slurry further comprises a pore former.

Embodiment 9: The process of embodiment 8, further comprising removing the pore former from the ion-conducting layer before transferring the ion-conducting layer from the decal layer onto the ion-conducting polymer membrane.

Embodiment 10: The process of any one of embodiments 1-9, wherein the nonionic conductive slurry further comprises a pore former.

Embodiment 11: The process of embodiment 10, further comprising removing the pore former from the nonionic conductive catalyst layer before hot pressing the nonionic conductive catalyst layer onto the ion-conducting layer.

Embodiment 12: An electrochemical cell made by the process of claim 1, the electrochemical cell comprising:
- an ion-conducting polymer membrane having a first surface and a second surface;
- a first hybrid electrocatalyst layer having a first surface and a second surface, the first surface of the first hybrid electrocatalyst layer contacting the first surface of the ion-conducting polymer membrane, the first hybrid electrocatalyst layer comprising:
  - a first ion-conducting layer; and
  - a first nonionic conductive catalyst layer;
- a first species diffusion/transport layer contacting the second surface of the first hybrid electrocatalyst layer, wherein the first species diffusion/transport layer contacts the first nonionic conductive catalyst layer and the ion-conducting polymer membrane contacts the first ion-conducting layer;
- a second hybrid electrocatalyst layer having a first surface and a second surface, the first surface of the second hybrid electrocatalyst layer contacting the second surface of the ion-conducting polymer membrane, the second hybrid electrocatalyst layer comprising:
  - a second ion-conducting layer; and
  - a second nonionic conductive catalyst layer; and
- a second species diffusion/transport layer contacting the second surface of the second hybrid electrocatalyst layer, wherein the second species diffusion/transport layer contacts the second nonionic conductive catalyst layer and the ion-conducting polymer membrane contacts the second ion-conducting layer.

Embodiment 13: The electrochemical cell of embodiment 12, wherein the electrochemical cell is suitable for use in an electrolyzer, in a hydrogen pump, in gas/gas cell-based ammonia synthesis, or in gas/gas cell-based carbon dioxide electroreduction.

Embodiment 14: The electrochemical cell of embodiment 12 or 13, wherein the first ion-conducting layer, the second ion-conducting layer, or both the first ion-conducting layer and the second ion-conducting layer comprises a plurality of ion-conducting layers.

Embodiment 15: The electrochemical cell of any one of embodiments 12-14, wherein the plurality of ion-conducting layers defines a concentration gradient of an ionomer along the thickness of the plurality of ion-conducting layers.

Embodiment 16: The electrochemical cell of embodiment 14, wherein the plurality of ion-conducting layers defines a porosity gradient along the thickness of the plurality of ion-conducting layers.

Embodiment 17: The electrochemical cell of any one of embodiments 12-16, wherein the ion-conducting polymer membrane is a sodium-form ion-conducting polymer membrane.

Embodiment 18: The electrochemical cell of any one of embodiments 12-17, wherein the first ion-conducting layer and the second ion-conducting layer each comprise an ionomer.

Embodiment 19: The electrochemical cell of embodiment 18, wherein the ionomer is a sodium-form ionomer.

Embodiment 20: A process for making an electrochemical cell comprising:
- coating a nonionic conductive slurry onto a decal layer;
- sintering the coated decal layer to form a nonionic conductive catalyst layer on the decal layer;
- coating a sodium-form ion-conducting slurry comprising a sodium-form ionomer onto the nonionic conductive catalyst layer;
- drying the ion-conducting slurry to form a hybrid electrocatalyst layer comprising an ion-conducting layer and a nonionic conductive catalyst layer; and
- hot pressing the hybrid electrocatalyst layer onto a sodium-form ion conducting polymer membrane.

Embodiment 21: The process of embodiment 20, wherein the sintering is performed at a temperature from about 300° C. to about 400° C.

Embodiment 22: The process of embodiment 20 or 21, wherein the ion-conducting slurry further comprises a solvent and an electrocatalyst.

Embodiment 23: The process of any one of embodiments 20-22, wherein the nonionic conductive slurry comprises a solvent, a nonionic conductive binder, and an electrocatalyst.

Embodiment 24: The process of any one of embodiments 20-23, wherein the hot pressing is conducted at a pressure from about 70 psi to about 150 psi and temperature from about 80° C. to about 140° C.

Embodiment 25: The process of any one of embodiments 20-24, wherein the decal layer comprises a glass fiber layer coated with polytetrafluoroethylene.

Embodiment 26: The process of any one of embodiments 20-25, wherein the sodium-form ion-conducting polymer membrane comprises a sodium-form perfluorosulfonic acid-based polymer.

Embodiment 27: The process of any one of embodiments 20-26, wherein the ion-conducting slurry further comprises a pore former.

Embodiment 28: The process of embodiment 27, further comprising removing the pore former from the ion-conducting layer before transferring the ion-conducting layer from the decal layer onto the ion-conducting polymer membrane.

Embodiment 29: The process of any one of embodiments 20-28, wherein the nonionic conductive slurry further comprises a pore former.

Embodiment 30: The process of embodiment 29, further comprising removing the pore former from the nonionic conductive catalyst layer before hot pressing the nonionic conductive catalyst layer onto the ion-conducting layer.

What is claimed is:

1. A process for making an electrochemical cell comprising:
    coating a nonionic conductive slurry onto a decal layer;
    sintering the coated decal layer to form a nonionic conductive catalyst layer on the decal layer;
    coating a sodium-form ion-conducting slurry comprising a sodium-form ionomer and a pore former onto the nonionic conductive catalyst layer;
    drying the ion-conducting slurry to form a hybrid electrocatalyst layer comprising an ion-conducting layer and a nonionic conductive catalyst layer; and
    hot pressing the hybrid electrocatalyst layer onto a sodium-form ion conducting polymer membrane.

2. The process of claim 1, wherein the sintering is performed at a temperature from about 300° C. to about 400° C.

3. The process of claim 1, wherein the ion-conducting slurry further comprises a solvent and an electrocatalyst.

4. The process of claim 1, wherein the nonionic conductive slurry comprises a solvent, a nonionic conductive binder, and an electrocatalyst.

5. The process of claim 1, wherein the hot pressing is conducted at a pressure from about 70 psi to about 150 psi and temperature from about 80° C. to about 140° C.

6. The process of claim 1, wherein the decal layer comprises a glass fiber layer coated with polytetrafluoroethylene.

7. The process of claim 1, wherein the sodium-form ion-conducting polymer membrane comprises a sodium-form perfluorosulfonic acid-based polymer.

8. The process of claim 1, further comprising removing the pore former from the ion-conducting layer before transferring the ion-conducting layer from the decal layer onto the ion-conducting polymer membrane.

9. The process of claim 1, wherein the nonionic conductive slurry further comprises a pore former.

10. The process of claim 9, further comprising removing the pore former from the nonionic conductive catalyst layer before hot pressing the nonionic conductive catalyst layer onto the ion-conducting layer.

11. A process for making an electrochemical cell comprising:
    coating a nonionic conductive slurry onto a decal layer, the nonionic conductive slurry comprising a pore former;
    sintering the coated decal layer to form a nonionic conductive catalyst layer on the decal layer;
    coating a sodium-form ion-conducting slurry comprising a sodium-form ionomer onto the nonionic conductive catalyst layer;
    drying the ion-conducting slurry to form a hybrid electrocatalyst layer comprising an ion-conducting layer and a nonionic conductive catalyst layer; and
    hot pressing the hybrid electrocatalyst layer onto a sodium-form ion conducting polymer membrane.

12. The process of claim 11, wherein the sintering is performed at a temperature from about 300° C. to about 400° C.

13. The process of claim 11, wherein the ion-conducting slurry further comprises a solvent and an electrocatalyst.

14. The process of claim 11, wherein the nonionic conductive slurry comprises a solvent, a nonionic conductive binder, and an electrocatalyst.

15. The process of claim 11, wherein the hot pressing is conducted at a pressure from about 70 psi to about 150 psi and temperature from about 80° C. to about 140° C.

16. The process of claim 11, wherein the decal layer comprises a glass fiber layer coated with polytetrafluoroethylene.

17. The process of claim 11, wherein the sodium-form ion-conducting polymer membrane comprises a sodium-form perfluorosulfonic acid-based polymer.

18. The process of claim 11, wherein the ion-conducting slurry further comprises a pore former.

19. The process of claim 18, further comprising removing the pore former from the ion-conducting layer before transferring the ion-conducting layer from the decal layer onto the ion-conducting polymer membrane.

20. The process of claim 11, further comprising removing the pore former from the nonionic conductive catalyst layer before hot pressing the nonionic conductive catalyst layer onto the ion-conducting layer.

* * * * *